US010926921B2

(12) United States Patent
Rølund

(10) Patent No.: US 10,926,921 B2
(45) Date of Patent: Feb. 23, 2021

(54) PALLET SHELF SYSTEM AND METHOD OF STORING GOODS ON A PALLET SHELF SYSTEM

(71) Applicant: SpaceInvader ApS, Copenhagen K (DK)

(72) Inventor: Jesper Rølund, Copenhagen S (DK)

(73) Assignee: SpaceInvadr ApS, Copenhagen (DK)

( * ) Notice: Subject to any disclaimer, the term of this patent is extended or adjusted under 35 U.S.C. 154(b) by 0 days.

(21) Appl. No.: 16/461,611

(22) PCT Filed: Nov. 27, 2017

(86) PCT No.: PCT/EP2017/080569
§ 371 (c)(1),
(2) Date: May 16, 2019

(87) PCT Pub. No.: WO2018/096158
PCT Pub. Date: May 31, 2018

(65) Prior Publication Data
US 2020/0062450 A1 Feb. 27, 2020

(30) Foreign Application Priority Data

Nov. 27, 2016 (DK) .......................... PA 2016 00731

(51) Int. Cl.
*B65D 19/38* (2006.01)
*B65G 1/04* (2006.01)

(52) U.S. Cl.
CPC ............ *B65D 19/385* (2013.01); *B65G 1/04* (2013.01); *B65D 2519/00029* (2013.01);
(Continued)

(58) Field of Classification Search
CPC ........... B65D 2519/00935; B65D 2519/00955; B65D 2519/0097; B65D 2519/00965; B65D 2519/0096; A47B 87/0207
(Continued)

(56) References Cited

U.S. PATENT DOCUMENTS 2,046,095 A * 6/1936 Shaw ................. A47B 87/0207
211/85.17
2,700,520 A * 1/1955 Skubic ................ B65D 19/385
108/53.5
(Continued)

FOREIGN PATENT DOCUMENTS

DK 178075 B1 5/2015
EP 1491454 A1 12/2004
(Continued)

OTHER PUBLICATIONS

International Search Report and Written Opinion for PCT/EP2017/080569, dated Feb. 8, 2018.

*Primary Examiner* — Jose V Chen
(74) *Attorney, Agent, or Firm* — Olive Law Group, PLLC

(57) ABSTRACT

Pallet shelf system (4) having at least two pallet decks, said system comprising at least two standard pallets (10a, 10b), each standard pallet comprising at least two fork pockets for receiving the forks of a forklift, at least four upright support posts (42a, 42b, 42c, 42d), two lower pallet base units (21a, 21b) comprising respective protrusions matching a respective fork pocket on a lower pallet (10a), and at least two upper pallet base units (41a, 41b), wherein two support frames (40a, 40b) are formed from said pallet base units and said upright support posts, said upper pallet base units (41a, 41b) supporting the upper pallet's outer pallet legs.

19 Claims, 13 Drawing Sheets

(52) U.S. Cl.
CPC .............. *B65D 2519/00064* (2013.01); *B65D 2519/00099* (2013.01); *B65D 2519/00233* (2013.01); *B65D 2519/00273* (2013.01); *B65D 2519/00293* (2013.01); *B65D 2519/00323* (2013.01); *B65D 2519/00333* (2013.01); *B65D 2519/00676* (2013.01); *B65D 2519/00796* (2013.01); *B65D 2519/00965* (2013.01)

(58) Field of Classification Search
USPC .................................................. 108/53.1, 91
See application file for complete search history.

(56) References Cited

U.S. PATENT DOCUMENTS

| | | | | |
|---|---|---|---|---|
| 2,941,772 | A * | 6/1960 | Thayer | A47B 57/14 108/53.1 |
| 3,447,490 | A * | 6/1969 | Eagland | B65D 19/06 108/53.5 |
| 4,002,126 | A * | 1/1977 | Bell | B65D 19/0075 108/53.5 |
| 4,673,092 | A * | 6/1987 | Lamson | A47B 47/028 108/53.1 |
| 4,955,490 | A | 9/1990 | Schafer | |
| 5,137,165 | A * | 8/1992 | Friman | B65D 19/14 217/36 |
| 5,671,854 | A * | 9/1997 | Thomas | B65D 88/12 220/1.5 |
| 6,186,077 | B1 * | 2/2001 | Lim | B65D 19/0095 108/56.1 |
| 6,286,792 | B1 * | 9/2001 | Best | B65D 19/08 108/53.1 |
| 7,559,285 | B2 * | 7/2009 | Smith | B65D 19/385 108/33 |
| 7,997,213 | B1 * | 8/2011 | Gauthier | B65D 88/129 108/53.1 |
| 2004/0016374 | A1 * | 1/2004 | de Jong | B65G 1/026 108/91 |
| 2009/0057191 | A1 * | 3/2009 | Temple, Jr. | B65D 19/12 206/600 |
| 2011/0303129 | A1 * | 12/2011 | Harris | B65D 19/08 108/53.1 |
| 2013/0284687 | A1 * | 10/2013 | Maiworm | B65D 19/385 211/186 |
| 2015/0158629 | A1 * | 6/2015 | Harris | B65D 19/385 108/53.3 |
| 2015/0344175 | A1 * | 12/2015 | Kemmer, Jr. | B65D 19/385 108/53.1 |
| 2016/0264291 | A1 * | 9/2016 | Hansen | A47B 47/0083 |
| 2016/0264292 | A1 * | 9/2016 | Schoening | G06Q 10/0833 |
| 2017/0203875 | A1 * | 7/2017 | Tattam | B65D 19/385 |
| 2019/0135487 | A1 * | 5/2019 | Ramon | B65D 19/385 |

FOREIGN PATENT DOCUMENTS

| | | |
|---|---|---|
| FR | 2747997 A1 | 10/1997 |
| GB | 2231522 A | 11/1990 |
| WO | 2015055206 A1 | 4/2015 |
| WO | 2015180870 A1 | 12/2015 |
| WO | 2016009009 A1 | 1/2016 |

* cited by examiner

| | | |
|---|---|---|
| 20' STANDARD | 10 standard pallets 1,2 x 1,0m | |
| | 11 europallets 1,2 x 0,8m | |
| 40' STANDARD | 21 standard pallets 1,2 x 1,0m | |
| | 25 europallets 1,2 x 0,8m | |
| 40' PALLETWIDE | 24 standard pallets 1,2 x 1,0m | |
| | 30 europallets 1,2 x 0,8m | |
| 45' STANDARD | 24 standard pallets 1,2 x 1,0m | |
| | 27 europallets 1,2 x 0,8m | |
| 45' PALLETWIDE | 26 standard pallets 1,2 x 1,0m | |
| | 33 europallets 1,2 x 0,8m | |

Figure 10

PALLET SHELF SYSTEM AND METHOD OF STORING GOODS ON A PALLET SHELF SYSTEM

CROSS REFERENCE TO RELATED APPLICATIONS

This application is a 35 USC 371 application of PCT International Patent Application No. PCT/EP2017/080569, filed on Nov. 27, 2017, which claims priority to Denmark Patent Application No. PA201600731, filed on Nov. 27, 2016; the contents of which are hereby incorporated by reference herein in their entireties.

FIELD

The present invention concerns a pallet shelf system for storage of goods, in particular for storage of goods on standardized pallets, e.g. euro pallets, as well as a method of storing goods.

BACKGROUND

Within logistics, the use of standardized pallets makes it possible for a carrier to efficiently utilize cargo space in e.g. trucks, either during transport or during storage e.g. in warehouses, and at the same time, the packing of goods on pallets also allows an easy and efficient loading and unloading between e.g. warehouses and trucks.

Pallets for transporting goods are widely known. They are available according to a number of industry standards, e.g. euro pallets, ISO pallets or various Australian or North American pallet standards. These pallets are generally of a size that makes it possible for forklifts of ordinary size to handle such pallets with goods, one by one at a time. FIG. 1 shows an example of a EUR pallet (10), called euro pallet, usually made from wood, which is used in the present document to illustrate the functionality of the present invention, seen along the long axis (FIG. 1A) or longitudinal direction, the short axis (FIG. 1B) or crosswise direction, and from above (FIG. 1C). A euro pallet has two longitudinally pockets (11a,11b), called fork pockets, in the pallet at the short end ($l_2$), with a pocket width (a) of 227.5 mm, and a pocket height (b) of 100 mm. These fork pockets allow the forks of e.g. a forklift to support the pallet during a lift. The euro pallet's loading platform (14) is supported by three longitudinal ($l_1$) pallet feet (12a, 12b, 13). The dimensions of the euro pallet's loading surface are 800 mm in width ($l_2$) and 1200 mm in length ($l_1$). Usually, the three longitudinal pallet feet are not constructed in as respective solid feet, but rather they each respectively consist of a respective load carrying floor board (16a,16b,16c), for contacting a floor, and three respective blocks (17a,17b,17c), connecting a respective floor board to the loading surface of the pallet. Thereby is obtained two crosswise openings or fork pockets (15a,15b), whereby it becomes possible for a fork lifter or such like to access and to lift the pallet also in the crosswise direction of the pallet. Contrary though to the longitudinal fork pockets (11a,11b), the crosswise fork pockets (15a,15b) are not open towards the floor but are downwards closed by the aforementioned floor boards (16a,16b,16c).

As the present invention can be adapted to any of these pallet standards, where the pallet can be handled by e.g. a forklift, the present document will refer to such a pallet as "a standard pallet" or "a standard pallet comprising at least two fork pockets". These terms comprise, but are not limited to, euro pallets and ISO pallets, preferably euro pallets.

A pallet (10) is as shown in FIG. 1, mainly a flat structure that are used for transportation, and which stably supports the goods when lifted by a forklift, pallet lifter, front loader, pallet stacker or other lifting equipment. A pallet is the supportive construction of a load unit, which allows goods to be handled and stored efficiently thereupon. Goods or freight containers are often placed on a pallet and secured with tape, stretch wrap or shrink wrap, and shipped. Most pallets are made from wood, but also pallets made from plastics, metal and/or cardboard are known. Today there are numerous known pallet standards, primarily ISO pallets, North American pallets, EUR pallets and Australian standard pallets.

In order to increase the load and storage capacity for transport and storage of pallets, pallet shelf systems are often used. Pallet shelf systems are useful for storing pallets with goods when multiple layers of pallets placed on top of each other are desired. There are known pallet shelf systems in the art, see for example U.S. Pat. No. 4,955,490, or GB 2231522 A, which allow the secure storage of pallets with goods on pallet shelves that can be adapted to variable heights, depending on the goods stored on the pallet.

The weight of the pallets and goods means that the pallet shelf systems as known in the art, often lacks flexibility and simplicity in relation to mounting and assembly. This is especially a problem in many situations where a temporary pallet shelf system is desired, e.g. in the cargo space of a lorry or truck that not exclusively serves as a pallet transport.

DK 178075 B1 describes inventors' own pallet shelf system, which pallet shelf system is easy to assemble and disassemble, for use particularly in the cargo space of a truck or lorry, as well as a method for the storage of pallets in cargo holds with the use of a pallet shelf system.

In FIG. 2 the idea behind the invention according to DK 178075 B1 is illustrated. A set of four of the pallet shelf system's base units (21), herein referred to as pallet base unit or simply base unit, are assembled in pairs by at least two upright posts (22) with each pair of base units (21) thereby forming a pallet shelf frame (20a,20b), followed by the frames (20a,20b) being stabilized by two pallets (10) serving as shelves, whereby the pallet shelf system (2) with two shelves is formed. During use the pallets (10) rest on the base units (21), fully or partially. The base units (21) are designed to carry the weight of the pallet (10) with goods placed on top.

It is an advantage of the invention according to DK 178075 B1, that the pallet shelf system (2) can be assembled and disassembled without removing goods from the pallets during assembly or disassembly. This allows the pallet shelves to be easily assembled for temporary storage e.g. in the cargo space of a truck or lorry, and likewise to be easily disassembled as the cargo space is unloaded. Depending on the size of the goods the distance between the shelves can be varied by varying the length of the upright posts (22).

FIG. 3 shows the base unit (21) in more detail in accordance with the invention as described in DK 178075 B1. It comprises a rear piece (211) ending in an upper surface (216), and a plurality of protrusions (212) perpendicularly attached on one side of the rear piece (211). The protrusions (212) are matched in number and size to fit into each side opening or fork pocket of the pallet (10) for which the pallet shelf system (2) is adapted. As can be seen in FIGS. 1a and 1b, a euro pallet has two openings, fork pockets, at each end that can be accessed by a forklift. Normally the forklift enters from the short end (FIG. 1A) but the invention according to DK 178075 B1 is applicable to both options. Depending on the loads which the mentioned protrusions (212) are supporting, caused by said pallet and goods on said pallet, the construction of said protrusions (212) can vary.

However, it has been found that the pallet shelf system according to the prior art has certain design limitations that the present invention overcomes and improves. For example, the pallet shelf system (2) when established is particularly suitable, according to the prior art using the method described in the prior art, to be lifted e.g. with a forklift in which the forks of the forklift engage in the pallets' longitudinal direction underneath the pallet shelf system, i.e. by lifting below the lower pallet in the gravitational direction. It is possible that in certain embodiments of the pallet shelf system, according to the prior art, to lift the pallet shelf system by lifting below, in the gravitational direction, upper pallet, however due to the construction of the pallet shelf system in the prior art, with certain limitations as described below.

It is a particular advantage of the pallet shelf system (4,9) according to the present invention that the pallet shelf systems can be established using both the longitudinal fork pockets (11a,11b) as well as the crosswise fork pockets (15a,15b) on the constituting pallets (10a,10b), while still permitting a forklift to move the resulting pallet shelf system from its place of assembly and e.g. into a semitrailer or a container.

WO 2015/180870 also discloses a pallet shelf system according to claim 1 of DK 178075 B1, however with certain structural changes in relation to the embodiment of a pallet shelf system shown in the drawings of DK 178075 B1. Both the pallet shelf system according to DK 178075 B1 and WO 2015/180870 comprise an upper and lower base unit, but the illustrated example of a pallet shelf system in DK 178075 B1 is symmetrically constructed using two identical base units (21) as described above, while the pallet shelf system according to WO 2015/180870 only comprises a lower base unit (21) according to the example shown in DK 178075 B1, but has been changed at certain points relative to the upper base unit. In WO 2015/180870, the upper base unit is designed to support the two outer pallet legs (12a,12b) of the upper pallet (10b) on two extended segments of said support posts (22), on which two support surfaces and fitting edges are mounted on the two support surfaces such that a carrying shoe is formed on each support pole that engages the upper pallet, whereby the upper pallet (10b) can be held during transport. A transverse carrier is placed under the carrier shoes between two pairs of support posts, whereby a support frame structure with some stability is established.

However, it represents a stability problem in the pallet shelf system according to WO 2015/180870 that the carrier shoes alone are in contact with the upper pallet (10b) through said support surface whereby the established pallet shelf system according to WO 2015/180870 is not protected against that the upper pallet of goods and the two carriers can move independently of each other during transport, especially transport with goods, by the pallet shelf system according to WO 2015/180870. Part of this problem is in WO 2015/180870 sought remedied by the fact that the four support posts and carrying shoes that are applicable in the pallet shelf system according to WO 2015/180870 engage both pallets (10a,10b) both on their short and on their long side. This however is costly in terms of floor space as will be further detailed below.

Due to this lack of stability during transport in the pallet shelf system, as known from WO 2015/180870, it is essential to achieve the required stability of the pallet shelf system according to WO 2015/180870 by stabilizing the two support frames of WO 2015/180870 against each other in the longitudinal direction of the pallets used, which in WO 2015/180870 is made either by interceptors or by surring. However, such a solution is particularly inappropriate if fast loading and unloading is desired but also when moving the pallet shelf system according to WO 2015/180870, the lack of stability will make it difficult to move the pallet shelf system, both with and without goods. Furthermore, it is problem when establishing a support frame, the carrier posts cannot be easily replaced if differences in heights should arise which one may wish to compensate for easily and which can only be difficult to stack when the pallet shelf system according to WO 2015/180870 is not in use.

It is further a problem that carrier posts and carriers in WO 2015/180870 engage around all sides of the pallets as this causes the clearance between the pallet shelves and the number of pallet shelf systems that can be mounted next to each other on a truck with a width target after the current EU-standard (largest width 2.55 m, European Union Council Directive 96/53/EC) to become reduced.

The present inventors have now observed that when the overall pallet shelf systems such as those described in the prior art are to be lifted, for example, when loading and unloading a lorry or semi-trailer, it is advantageous to lift under the upper pallet relative to lifting underneath it lower pallet, which has led the inventors to the present invention, since the known pallet shelf systems are not suitable for, or only limited, suitable for lifting under the upper pallet. Instead, it is preferred in the known systems that the lifting takes place under the lower pallets, which however presents numerous problems of instability e.g. form wobbling, as the pallet shelf systems of the prior art are not in fixed engagement with the pallets comprising goods, but rather that these only rest on the base units.

SUMMARY OF THE INVENTION

According to the invention there is disclosed in a first aspect and embodiment: A pallet shelf system (4,9) having at least two pallet decks (911,912,913), said system comprising at least two standard pallets (10a,10b), each standard pallet (10a,10b) comprising at least two fork pockets (11a,11b,15a,15b) for receiving the forks of a forklift; at least four upright support posts (42a-d); two lower pallet base units (21a,21b) comprising respective protrusions (212a,212b) matching a respective fork pocket (11a,11b,15a,15b) on a lower pallet (10a), and at least two upper pallet base units (41a,41b), each pallet base unit (21,41) adapted for supporting at least a part of the weight of a said standard pallet (10) including goods; wherein two support frames (40a,40b) are formed from said pallet base units (21a,41a), (21b,41b) through pairwise assembly of said support frames by joining a respective lower (21a,21b) and a respective upper (41a,41b) pallet base unit by means of at least two of said at least four upright support posts (42a-d); inserting said respective protrusions (212a,212b) of said two support frames (40a,40b) into matching respective fork pockets (11a,11b,15a,15b) on a lower pallet (10a) thereby forming a first pallet deck (911); and subsequently forming said pallet shelf system (4,9) comprising at least two pallet decks (911,912) by placing an upper pallet (10b) on top of said upper pallet base units (41a,41b), such that said upper pallet base unit (41a,41b) supports said upper pallet's (10b) outer pallet legs (12a,12b), and thereby forming a second pallet deck (912).

In an embodiment thereof: A pallet shelf system (4,9) having at least two pallet decks (911,912,913), said system (4,9) further comprising at least two extenders (90a,90b) and a further standard pallet (10); which at least two extenders (90a,90b) and said at least a further standard pallet, are configured to form a further pallet deck (913).

In an embodiment thereof: A pallet shelf system (4,9) wherein said extender (90) comprises at least two extender posts (92a,92b) and an upper pallet base unit (41).

In an embodiment thereof: A pallet shelf system (4,9); wherein a said support frame (40) or a said extender (90) is formed by connecting respectively said two support posts (42a,42b) or said two extender posts (92a,92b) at right angles to respective connecting sections (420a,420b) on said upper pallet base unit (41), thereby forming an H-shaped or a U-shaped support frame (40) or extender (90).

In an embodiment thereof: A pallet shelf system (4,9); wherein said upper pallet base unit (41) comprises stopping means (413a-f,414a-b).

In an embodiment thereof: A pallet shelf system (4,9); wherein a said support frame (40) is assembled from five individually manufactured basic construction parts.

In an embodiment thereof: A pallet shelf system (4,9; wherein a said support frame (40) and/or said extender (90) is/are manufactured from aluminium.

Also in accordance with the invention there is disclosed: A cargo hold comprising at least one pallet shelf system (4,9) according to any embodiments disclosed herein.

Also in accordance with the invention there is disclosed: A method of storing goods on a pallet shelf system (4,9) comprising providing at least two standard pallets (10a,10b) comprising goods and assembling a pallet shelf system (4,9) according to any of the embodiments disclosed herein using said at least two standard pallets (10a,10b) comprising goods.

Also in accordance with the invention there is disclosed: A method of forming a stack (80) of support frames (40), each support frame (40) for use in a pallet shelf system (4,9) according to any of embodiments disclosed herein, on a standard pallet (10) for transport comprising: In a first step, a first support frame (40a) is placed under a standard pallet (10) by inserting the protrusions (212a,212b) of the lower base unit (21) into the respective longitudinal fork pocket (11a,11b) of said pallet; in a next and second step a next support frame (40b) is placed with a lowest bottom surface (417) of said pallet base unit (41b) on top of said first support frame (40a)'s upper pallet base unit (41a)'s pallet supporting surface (416) and on top of said standard pallet (10), in a such way that said next support frame (40b)'s support posts (42) are closely positioned or touches the said first support frame (40a)'s support posts (42) over a significant part of the lengths ($h_1$) of said support posts (42); in a third step repeating said second step until a predetermined stack height is obtained and a first partial stack (81a) is established, whereupon in a fourth step said second and third steps are repeated, thereby establishing at least one, preferably two further partial stacks (81a,81b,81c), until the stacking on said standard pallet (10) is terminated with a single support frame (40c).

In an embodiment thereof there is disclosed: A method of forming a stack (80) of support frames (40), wherein said respective partial stacks (81a,81b,81c) individually comprise up to six support frames (40) in each respective partial stack.

BRIEF DESCRIPTION OF THE DRAWINGS

FIG. 10 shows modes of loading various cargo holds with the pallet shelf system of the invention.

DETAILED DESCRIPTION

Figure 4A:
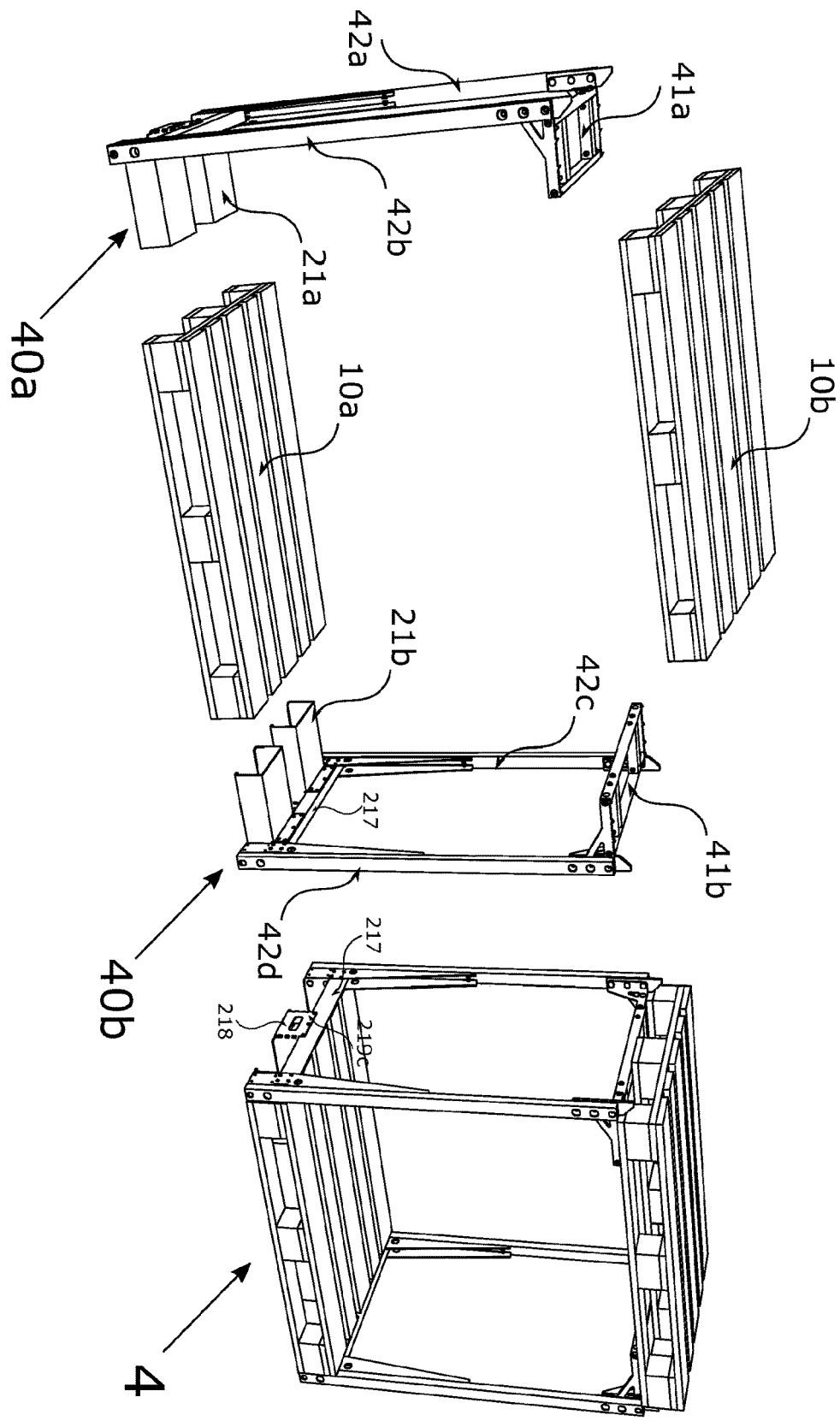
FIGS. 4A and 4B show a pallet shelf system in accordance with the present invention, longitudinally oriented (4A) and crosswise (4B).
Figure 4B:
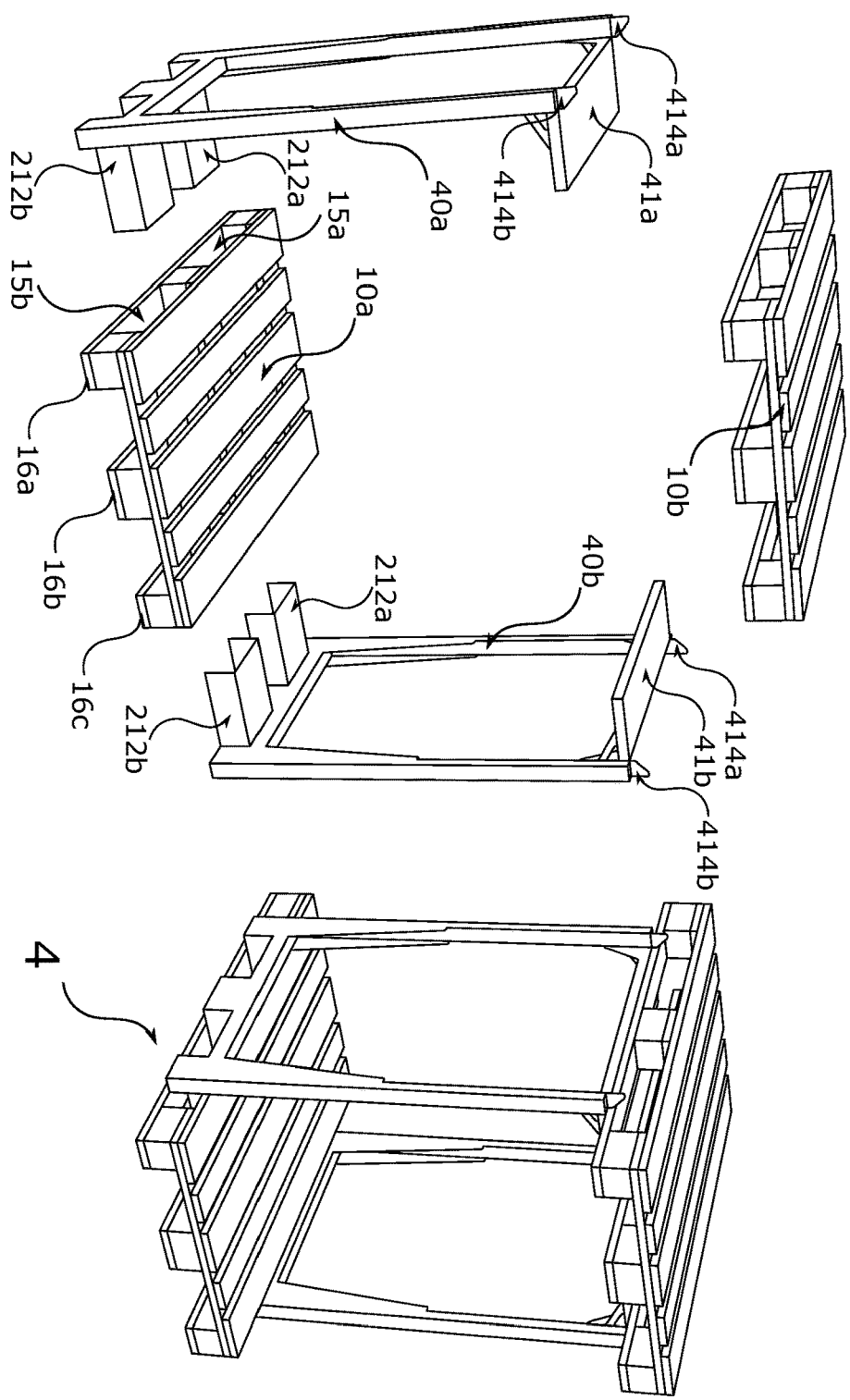

The principle of the pallet shelf system (4) according to the present invention is illustrated in FIGS. 4A and 4B. Similar to the prior art, the pallet shelf system (4) of the present invention comprises at least two standard pallets (10a,10b), each standard pallet (10a,10b) dimensioned according to an internationally recognized industry standard for pallets for transport of goods. The standard pallets must present pairwise at least two fork pockets (11a,11b), (15a, 15b) in opposite ends.

The pallet shelf system (4) further comprises at least four upright posts (42a-d); two lower pallet base units (21a,21b) and two upper pallet base units (41a,41b), wherein each pallet base unit is suitable for supporting at least a part of the weight of a standard pallet (10) including goods; wherein two support frames (40a,40b) are formed from said pallet base units (21a,41a,21b,41b) by assembly in pairs of said support frames by joining of a lower (21a,21b) and an upper (41a,41b) pallet base unit by means of at least two of said at least four upright support posts (42a-d); where next said pallet shelf system (4) is stabilized with at least two standard pallets (10a,10b) wherein said same pallets (10a,10b) function as shelves, thereby forming said pallet shelf system (4) with at least two shelves or pallet decks (911,912,913).

Figure 5A:
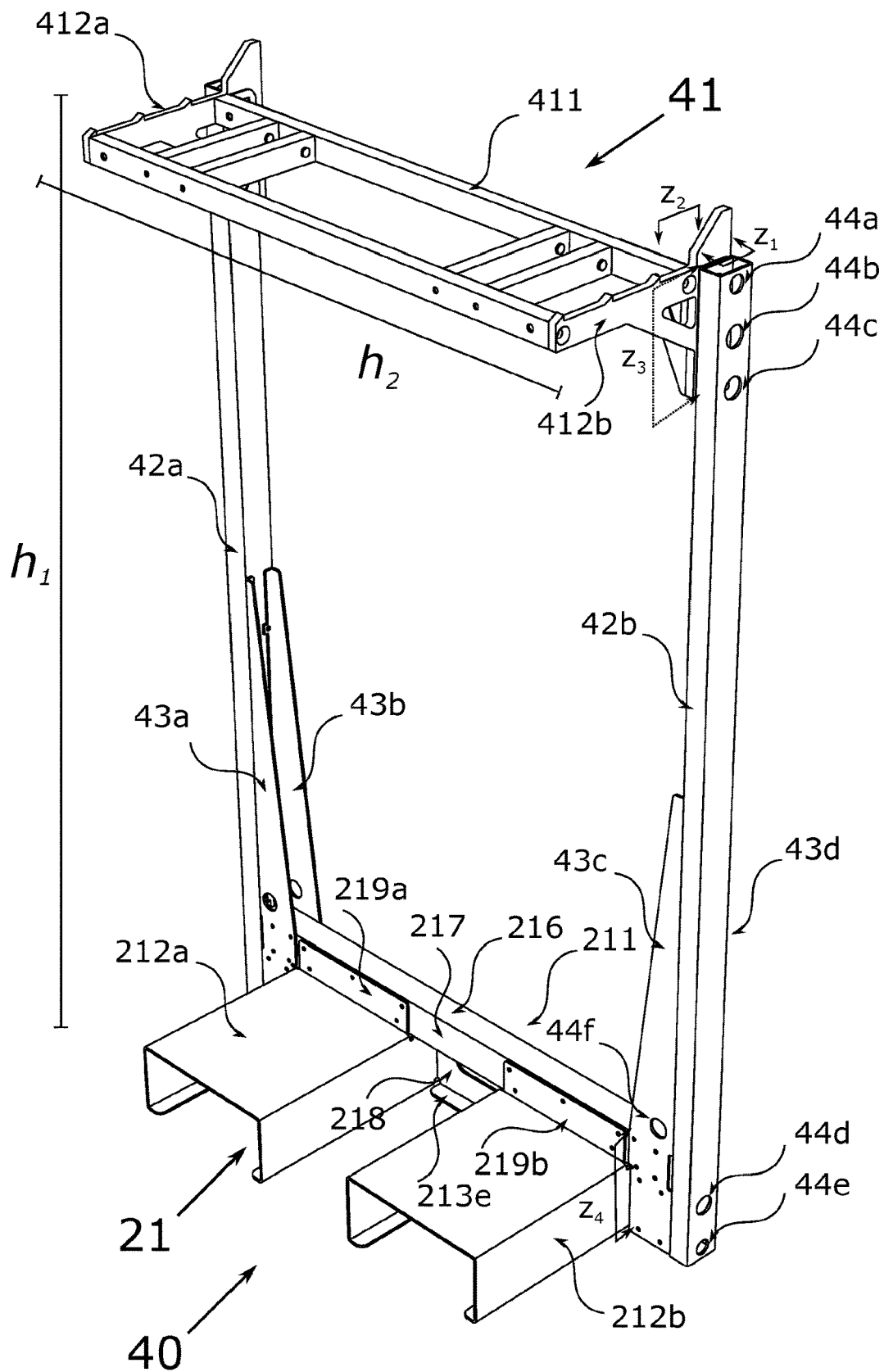
FIGS. 5A and 5B show a support frame in accordance with the present invention assembled by parts (5A) and from pre-made units (5B).
Figure 5B:
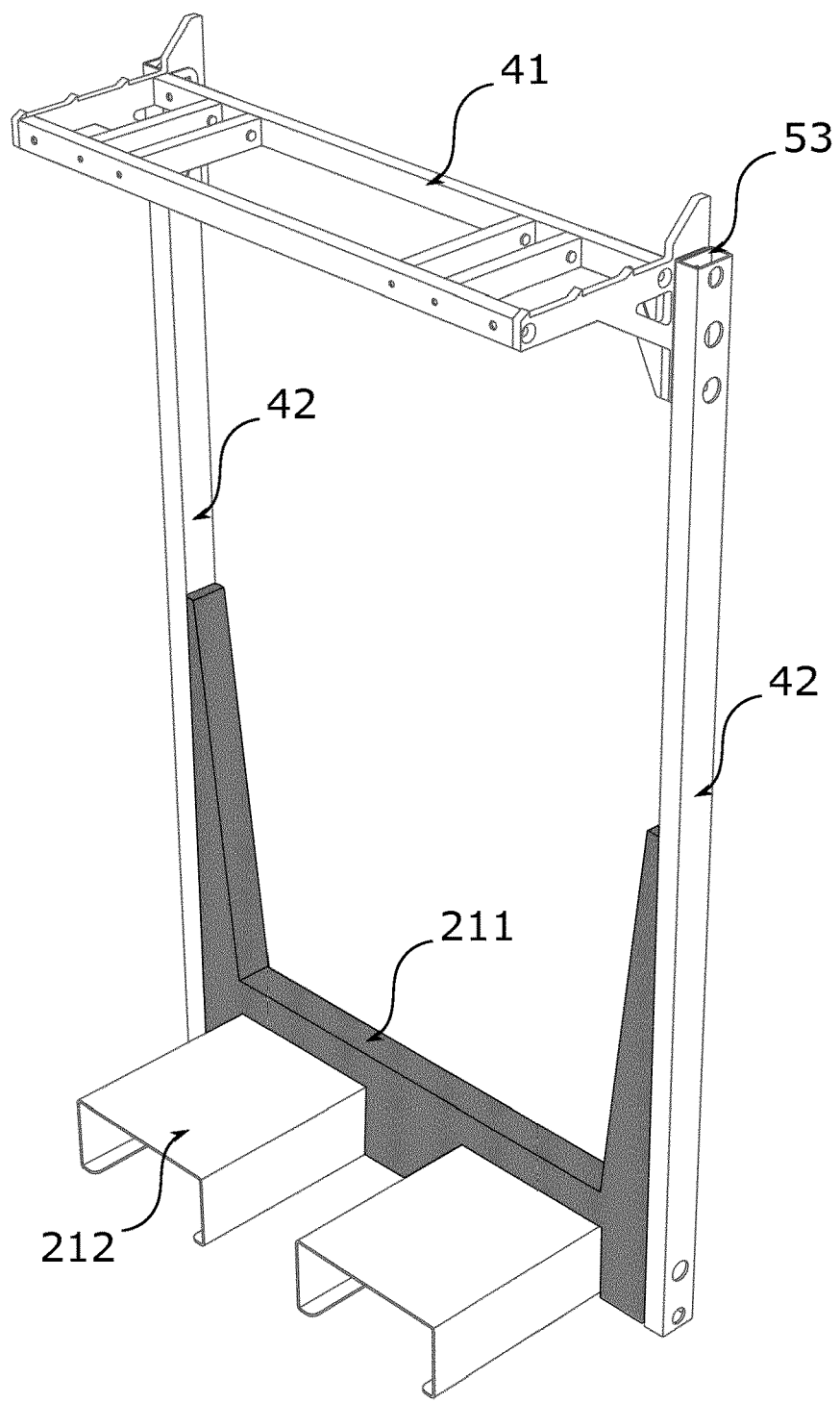
Figure 6A:
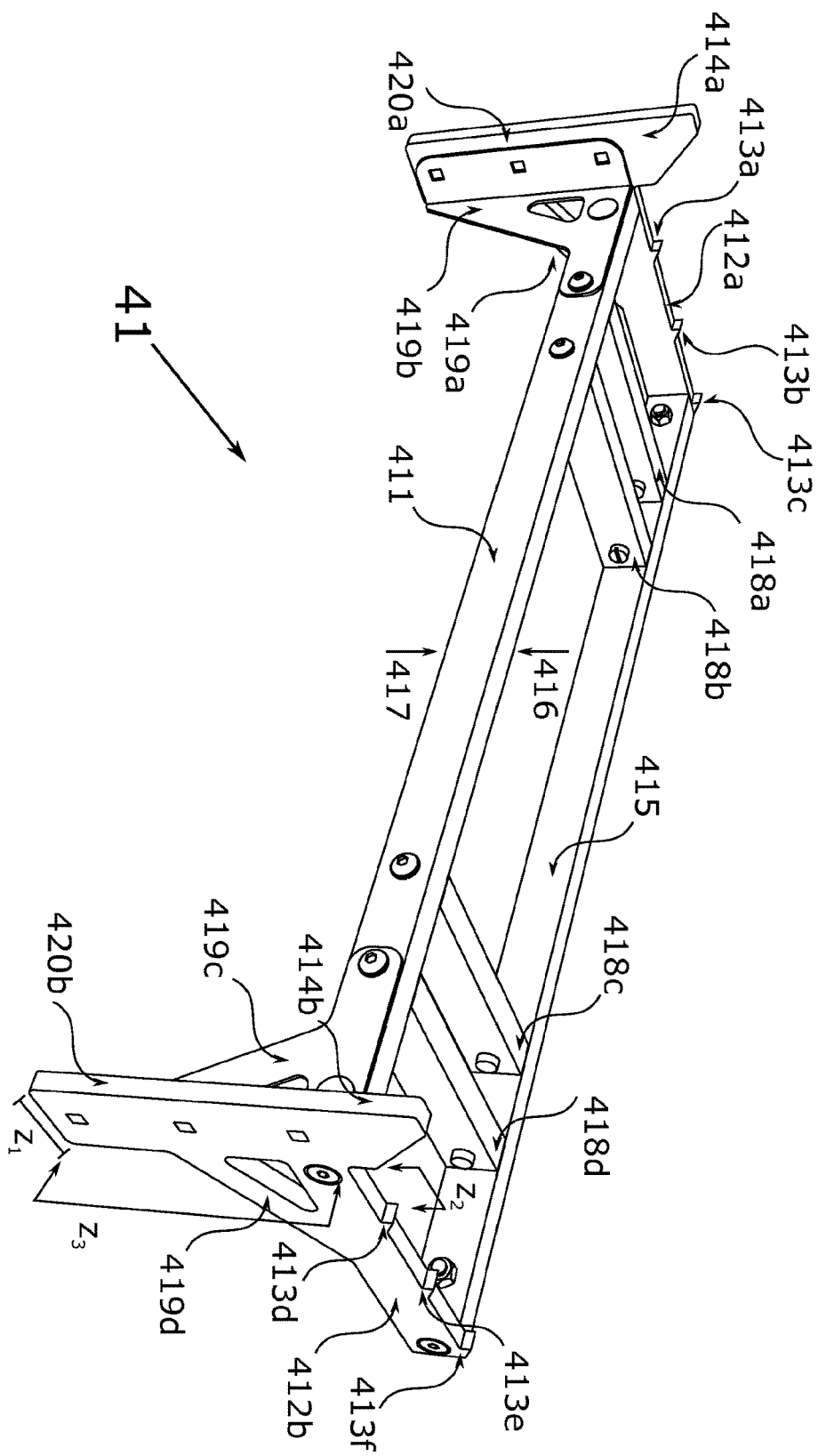
FIGS. 6A and 6B show an upper pallet base unit in accordance with the present invention assembled by parts (6A) and as a single cast unit (6B).
Figure 6B:
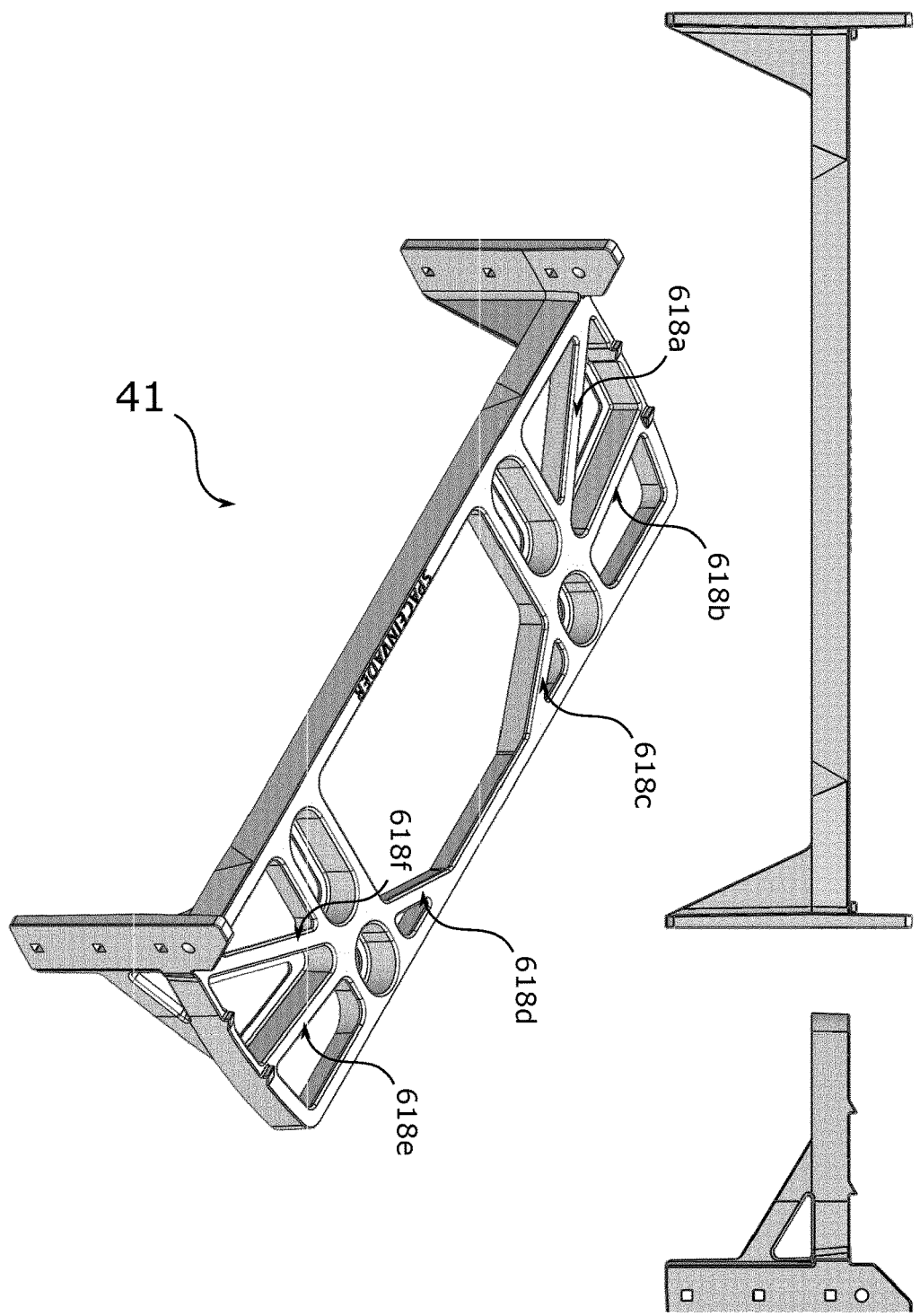

Compared to the prior art, however, a number of structural modifications and decisions have been made, further detailed in FIGS. 5A and 5B, in which an example of a support frame (40) according to the invention is shown, and in FIGS. 6A and 6B in which an example of an upper pallet base unit (41) is shown. Thereby an improved stability of the pallet shelf system (4) is achieved, which pallet shelf system (4), also when loaded with goods, can be lifted under the upper pallet base units (41a,41b).

A support frame (40) after the invention comprises the said at least two upright posts (42a, 42b) and said lower (21) and upper (41) pallet base units, wherein said lower (21) and upper (41) pallet base units are mutually arranged in parallel and connected through said at least two upright support posts (42a,42b), same upright support posts also being arranged in parallel. Preferably, the upright posts are arranged at the corners of the base units. Where necessary for structural support, e.g. for supporting heavy goods, further upright posts can easily be added, e.g. when the support posts (42a,42b) are located at the corners of the base units (21,41) between the aforementioned support posts.

The height ($h_1$) of the support frame (40), and thus the height of the upright posts (42a, 42b), can be freely varied depending upon the intended cargo to be transported or stored, while the width ($h_2$) on the support frame (40) should not exceed the width ($l_2$) of the relevant standard pallet, for example, 800 mm for the euro pallets. This ensures optimum utilization of the cargo floors in such trucks that carry and use the pallet shelf system (4) according to the invention. The upright support posts (42), as they appear in the drawings, are constructed as square profiles; which is preferred, but other types of posts can of course be used. Below will be described how, using square, hollow profiles, easy to assemble further shelves can be added to the pallet shelf system of the invention.

Following the instructions given herein, the support frames (40a,40b) when correctly assembled will be substantially symmetric around a center plane. Thereby the support frames can be oriented with the protrusions towards an opposite support frame, and the pallets (10a,10b) correctly places and serving as shelves.

Figure 3:
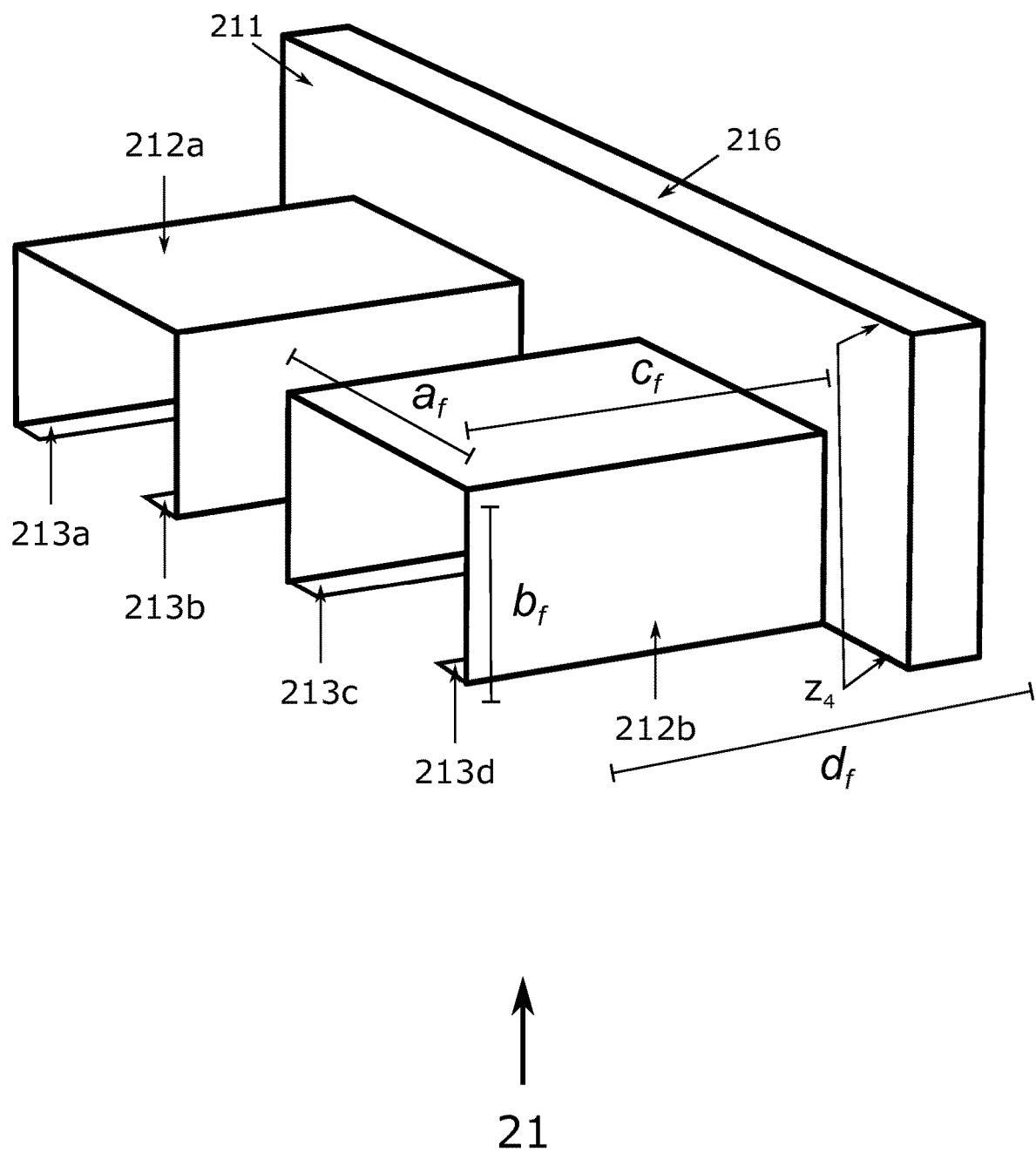
FIG. 3 shows a detailed view of a lower pallet base unit of the pallet shelf system.

A support frame (40) according to the invention comprises a lower pallet base unit (21), same lower pallet base unit (21) comprises a rear piece (211) and a plurality of protrusions (212a,212b) perpendicularly attached on one side of the rear piece (211), c.f. FIG. 3. The protrusions (212a,212b) are matched in number and in size to fit into each side opening of fork pocket of the pallet (10), for which the pallet shelf system (4) of the invention is adapted for. In the present example, where a euro pallet is used, the number of protrusions are two, corresponding to the number of fork pockets (11a,11b,15a,15b) in the euro pallet's longitudinal (11a,11b) or crosswise (15a,15b) direction. Since the fork pockets opening width (a) and opening height (b) (for a euro pallet's longitudinal direction an opening width (a) of 227.5 mm, and an opening height (b) of 100 mm), the dimensions ($a_p,b_p$) of the protrusions (212a,212b) shown in the drawing, are smaller, preferably slightly smaller, than the dimensions of the fork pockets (a,b) (as given by their respective standard) to ensure maximum support of the pallet resting on the protrusions. The length ($c_p$) of the protrusions (212a, 212b) is typically at least 15 cm, at least 20 cm, at least 25 cm or at least 30 cm and typically less than 50 cm or 40 cm. The length ($d_p$) represents the total length of a longest protrusion ($c_p$) and the rear piece (211) in accordance with FIG. 3.

Figure 1:
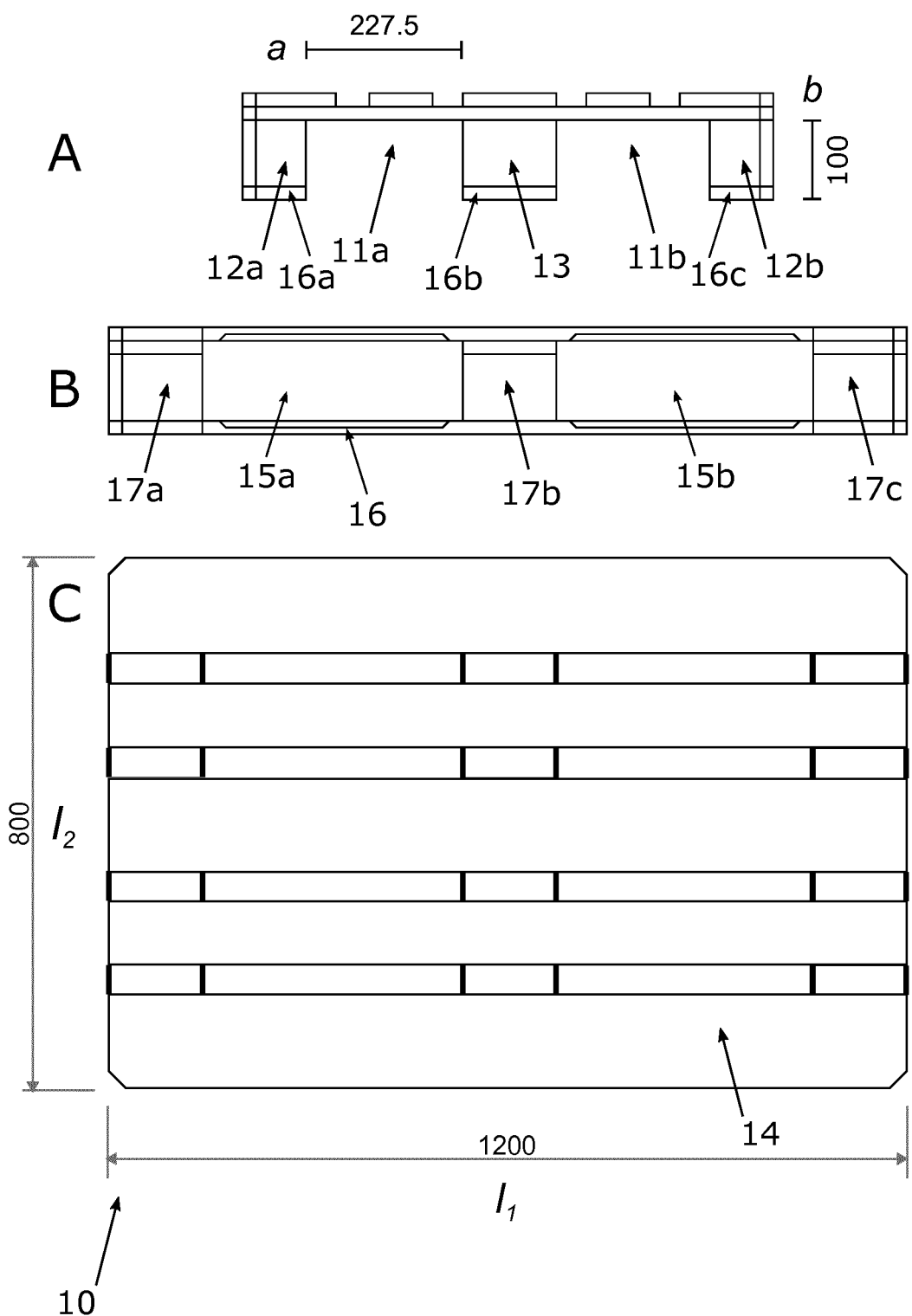
FIG. 1 shows a standard (EUR) pallet seen along the long axis (A), along the short axis (B) and from above (C).
Figure 2:
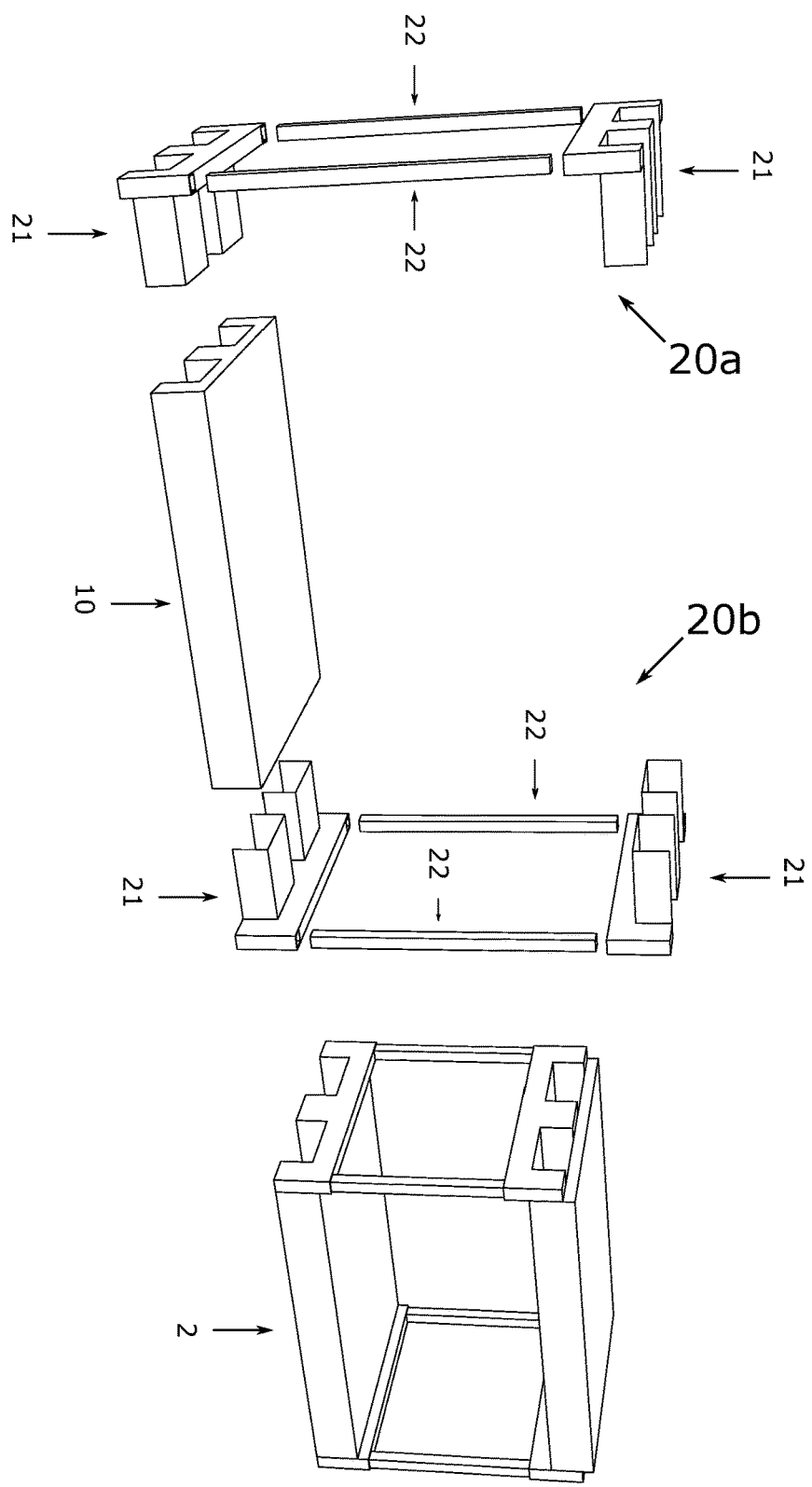
FIG. 2 shows a first embodiment of the pallet shelf system in accordance with DK 178075 B1.

The protrusions (212a,212b) of the lower pallet base unit (21) shown in FIGS. 2 and 3, are shown constructed as a closed structure, effectively a support case, but this is not limiting on the invention, since other protrusions with the required load bearing capacity to support a lower pallet (10a) and the weight of goods, can be imagined. However, in relation to the present invention the support case either is closed or partially open, is preferred, as will be explained below. When the protrusions (212a,212b) are constructed as support cases, it is advantageous, in order to save material and/or strengthen the construction, to let the side of the carrying case, which is in contact with e.g. the floor, be partially open and replaced with and/or added to one or more smaller carrier feet (213a-d). In one embodiment, the protrusions are connected towards the floor side, thus forming the closed structure, if, for example, due to high freight weight, it is desired to transfer a part of the weight to a larger surface for support.

In a particularly preferred embodiment of the lower base unit (21) (cf. e.g. FIGS. 4 and 5, the rear piece (211) comprises a crossbeam (217) at least two protrusions (212a, 212b) and at least one spacer (218), preferably at least one spacer (218) comprising feet (213e), wherein the at least two protrusions (212a,212b) are spaced apart by the at least one spacer (218) and the at least two protrusions and at least one spacer are attached to the crossbeam (217), preferably permanently attached to the crossbeam, and in a particularly preferred embodiment attached using attachment flanges (219a-c). When using sheet metal, these embodiments have the advantage that the protrusions (212a,212b), spacer (218), feet (213a-e), and flanges (219a-c) can be made from one sheet metal using cutting and bending and subsequently attached to the crossbeam (217) in a simple manner, e.g. permanently attached by welding or bolting.

A support frame (40) according to the invention, further comprises an upper pallet base unit (41), same upper pallet base unit (41) comprises a rear piece (411) and a plurality of protrusions (412a,412b) perpendicularly attached on one side of the rear piece (411), cf. FIGS. 6A and 6B, whereby forming a pallet supporting surface (416) and a bottom surface (417). The upper pallet base unit (41) shown in FIGS. 6A and 6B is here presented as an independent unit, which (similar to the lower pallet base unit (21) shown in FIG. 3) may be removably attached on said support posts (42), but obviously the lower (21) and/or the upper (41) pallet base unit may also be permanently attached on said support posts (42), e.g. by welding or bolting.

However, in contrast to the lower pallet base unit (21) which is in accordance with the base unit embodiment shown in the prior art, where the protrusions supports the underside of the pallet (10a)'s loading area (14), the protrusions (412a,412b) of the upper pallet base unit (41) in the shown embodiment of the present invention, are now positioned such that they support the pallet (10b)'s two outer pallet legs (12a,12b). In one embodiment the middle pallet leg (13) (or the middle pallet legs, if a respective pallet standard requires more pallet legs than three) can also be supported, to the extend further support beyond that provided by the rear piece (411) is required. In a preferred embodiment, rear piece (411) and protrusions (412a,412b) are combined with a front piece (415) to form a rectangular frame. Preferably, struts (418a-d) are located in parallel to and between the protrusions (412a,412b) connecting to the rear piece (411), and more preferably, the struts also connect to the front piece (415) when present. Preferably, the struts (418a-d) are located such a distance from a respective protrusion (412a,412b) that their position is beneath a respective fork pocket on the upper pallet (10b). Thereby the struts will be positioned on top of an eventual forklift lifting the pallet shelf system (4) with pallets (10a,10b) and goods in the upper pallet base unit (41) which will provide improved stability during a lift and distribution of weight from the upper pallet (10b) to the forks of the forklift.

By moving the support for the upper pallet (10b) to the two outer pallet legs (12a,12b) the upper pallet shelf (10b) of the pallet shelf system (4), can now easily be established during use. In the embodiment shown in the prior art, there could be conflicting space requirements between the forks of a forklift and the protrusions (212) on the lower pallet base unit (21). By placing the protrusions (412a,412b), under the pallet legs (12a,12b), this problem is avoided and loading and unloading of the upper pallet (10b) becomes substantially easier.

Surprisingly, it has further been found that the present improvements to the prior art has further advantages in that the loading and unloading of, for example, a truck now becomes substantially easier in relation to the shown embodiment of the pallet shelf system (2) of the prior art as shown in FIG. 2.

By moving the protrusions below the pallet legs (12a, 12b), the lower surface (417) of the upper pallet base unit's (41) rear piece (411) is arranged lower than the lower edge of the upper pallet (10b), which now enables the pallet shelf system (4) (with or without goods) to be lifted and moved with a forklift or the like by lifting under the two opposite rear piece's (411) lower surfaces (417). This causes the upper pallet (10b) to rest on the upper pallet base unit (41) which rests on the forks of the forklift while the lower pallet (10a) will hang from the forks, via the support frames (40a,40b) and supported by the lower pallet base units (21a,21b). In all embodiments, it is possible to lift longitudinally, but also where the pallet shelf system (4) has been established crosswise in accordance with the embodiment disclosed in FIG. 4B, it will be possible to lift longitudinally, if the length of the protrusions (412a,412b) have been chosen such that these will overlap the width of the forks of a forklift.

In the design of the pallet shelf system (2), as known from DK 1780751 B1, the pallet shelf system of the prior art, when lifting in the pallets' longitudinal direction, is lifted by the forklift under the lower pallet (10a), whereby a movement of the upper pallet will propagate through the pallet shelf system (2), with the risk of oscillations and static breakdown of the pallet shelf system (2) during the lift. By, as in the present invention, decoupling the movement of the upper and lower pallets during the lift, this problem is completely eliminated. This structure and method of lifting a pallet shelf system (4) according to the invention constitutes a substantial improvement of the embodiment of the pallet shelf system known from DK 1780751 B1 and the method for lifting and transportation of the same embodiment.

However, a challenge by supporting the pallet legs (12a, 12b) instead of the loading surface (14) is that the upper pallet or shelf (10b) is not now in the same way embedded in a structure that is mutually locked and thereby protected against moving in the upper pallet's (10b) upper surface (416) in response to external acceleration, such as e.g. rapid deceleration by a truck comprising the pallet shelf system of the invention.

In order to counteract to this challenge, it is advantageous that the upper pallet base unit (41) further comprises stopping means (413a-f,414a-b) to prevent movement of the upper pallet (10b) during transport or other movement of the pallet shelf system (4) according to the invention. Such stopping means can be designed in numerous ways, of which the means (413a-f,414a-b) shown in FIGS. 6A and 6B are preferred embodiments.

The stopping means (413a-f) according to the present invention's preferred embodiment comprises at least one, and preferably several spikes or barbs (413a-c,413d-f) arranged on the upper pallet supporting surface (416) of the protrusions (412), corresponding to the surface of the protrusions directly in contact with an upper pallet (10b) when the pallet shelf system (4) is established.

Since the spikes or barbs must be able engage in a locking contact with a pallet and goods during transport, the spikes or barbs should be accordingly solidly dimensioned, to achieve the desired stopping effect. In order to obtain an optimal effect of the spikes or barbs (413a-f) these are preferably arranged with the spikes or barbs in the same direction at any given protrusion, preferably perpendicular to the protrusion's longitudinal direction ($c_f$), but may also be arranged perpendicular to the protrusion's width direction ($a_f$). As the pallet shelf system (4) uses a pair of oppositely facing support frames (40), an upper pallet (10b) in the preferred embodiment of the invention will always be affected on each pallet leg (12a,12b) by two sets of oppositely directed spikes or barbs (413a-c,413d-f). For further stability and in a further embodiment, also spikes or barbs may be arranged on the rear piece (411) or the front piece (415) when present of the upper pallet base unit (41).

An advantage of the use of the spikes or barbs described herein is that since standard pallets, such as euro pallets, are typically made of cheap residual wood with a soft wood structure, the spike or barb will easily penetrate the pallet wood when the pallet is subjected to the weight of goods upon the pallet. In order to ensure the best possible loading and unloading of the pallet shelf system (4) the spikes or barbs (413a-f) in accordance with the preferred embodiment of the invention, are preferably triangularly shaped, with a vertical side, perpendicular to the protrusion's (412) longitudinal direction ($c_f$) and an inclined side which forms an angle to the vertical side, preferably between 30° to 60°, and more preferably at 45°.

It is a further benefit of the invention that the pallet shelf system (4) can also be established using the crosswise fork pockets (15a,15b) of the standard pallets (10), which are not otherwise open towards the floor but are downwards closed by the aforementioned floor boards (16a,16b,16c). In this method, the support frames (40a,40b) respectively engage the lower pallet (10a) by inserting respective protrusions (212a,212b) into respective and opposite crosswise fork pockets (15a,15b), whereupon the upper pallet (10b) is lowered onto the upper pallet base units (41a,41b). When the aforementioned stopping means (413a-f,414a-b) are present, the construction is also stable during transport. As will be detailed below, cf. FIG. 10, floor space packing e.g. in semitrailers, in containers of standard sizes, e.g. 20 or 40 ft. containers, ISO containers etc. can thereby be optimized.

Moreover, the support frame (40) or the upper pallet base unit (41) according to the invention may comprise one or more pallet guides (414a,414b) which serve to control the position of the upper pallet (10b) during loading and unloading, as well as to create an end stop for the same upper pallet (c.f. FIGS. 6A and 6B) In the embodiment shown, the pallet guide (414) comprises an inclined guiding surface, which is preferred, but other guides are known to the skilled person and can be applied in accordance with the present invention. It is advantageous that the pallet guides (414a,414b) are integrated into the upper pallet base unit (41), as this standardizes the pallet base unit, such that the support posts (42) easily can be exchanged between different pallet shelf systems (4), should the system's shelf height be desired varied, or stacked according to the method described below with reference to FIG. 8.

In FIGS. 6A and 6B showing embodiments of the upper pallet base unit (41), the static structure of the device is further enhanced through a variety of conventional static means that shall only be described here to a limited extent, since such static means, in general, are well known to the skilled person.

A static mean, that shall here be highlighted in relation to a preferred embodiment of the present invention is the aforementioned front piece (415) arranged between the protrusions (412a,412b), parallel to the rear piece (411), and preferably with the front piece's (415) lower edge in the same plane as said lower surface (417). This supports the pallet shelf system (4) during lifting according to the above mentioned method, and the weight of the upper pallet (10*b*) with or without goods is improvingly transferred to the forks of a forklift or the like. As previously mentioned, there may further be arranged one or more additional struts (418*a-d*) between the two said protrusions (412*a*, 412*b*).

Further, and as an embodiment of the pallet shelf system (4) that shall here be highlighted as preferred, a such a static mean can be slanting beams (419*a-d*), whereby the weight on the upper pallet base unit (41) in a better way can be transferred to the support posts (42). In the embodiment shown in FIGS. 6A and 6B, the respective slanting beams (419*a-d*) transfer the weight from the upper pallet base unit (41) to the two respective connecting sections (420*a*,420*b*) arranged on said upper pallet base unit (41), said same connecting sections suitable for being connected, either removably or fixedly, to said support posts (42), when said support frame (40) is to be assembled. The connecting sections (420*a*,420*b*) are downwardly terminated by a surface, which preferably has the same width as said upper pallet base unit's (41) protrusions (412*a*,412*b*). Further, the slanting beams 419*b* and 419*c* may in some embodiments serve as guides for the forks of a forklift engaging the pallet shelf system (4).

The embodiment shown in FIG. 6B represents a particularly preferred embodiment, wherein the upper pallet base unit (41) has been cast as a single unit, preferably in aluminum to reduce the weight of the construction to a minimum while retaining strength of loading. Additional struts (618*a-f*) are present compared to the embodiment of FIG. 6A, wherein the shown struts provided both additional structural stability of the upper pallet base unit (41) as well as providing flow channels for the molten metal for improved casting.

The support frames (40) of the invention may further be provided with longitudinal and transverse beams, in order to obtain additional stability. Such measures are known to the skilled person working with static constructions. In one embodiment, as shown in FIG. 5A, the present invention comprises a plurality of stabilizing beams (43*a-d*), preferably 4, arranged between said support posts (42*a*, 42*b*) and said lower pallet base unit (21). In a preferred embodiment of the above said embodiment, see FIG. 5A, said stabilizing beams (43*a-d*) are so designed that the lower edge of the beams (43*a-d*) is in plane with the lower edge of said lower pallet base unit (21).

In the embodiment shown in FIG. 5B, the support frame (40) has been assembled from five individually manufactured basic construction parts, these being support posts (42), lower rear piece (211), preferably the lower rear piece (211) comprising the aforementioned stabilizing beams (43*a-d*), upper pallet base unit (41) and protrusions (212*a*, 212*b*), preferably protrusions (212*a*,212*b*) spaced apart by the aforementioned spacer (218). These units can easily be manufactured by casting, contemplated for the lower rear piece (211) and the upper pallet base unit (41), extruding, contemplated for the support posts (42), and/or sheet metal folding, contemplated for the protrusions (212) as detailed herein, whereupon they can easily be assembled to form the support frames (40) of the invention e.g. by welding or bolting. Thereby the inherent high degree of symmetry comprised in the five basic construction parts of the support frames (40) is maximally used and production of the support frames (40) made easier and cheaper.

Figure 7:
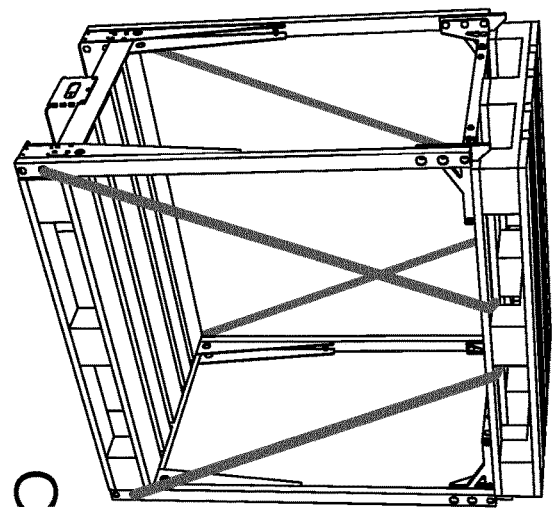
FIG. 7 shows how the pallet shelf system can be secured with straps or lashings during transport of pallets with goods.
Figure 7:
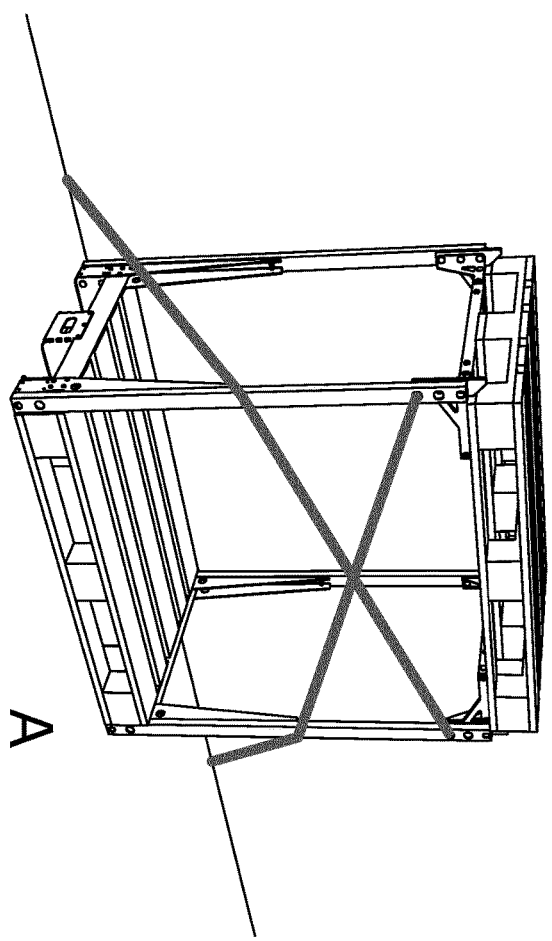
Figure 7:
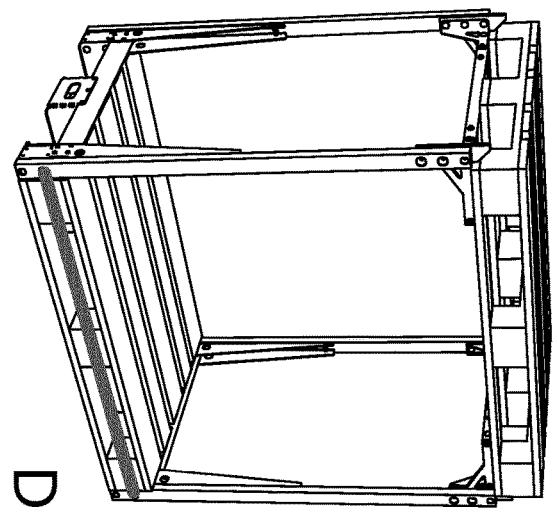
Figure 7:
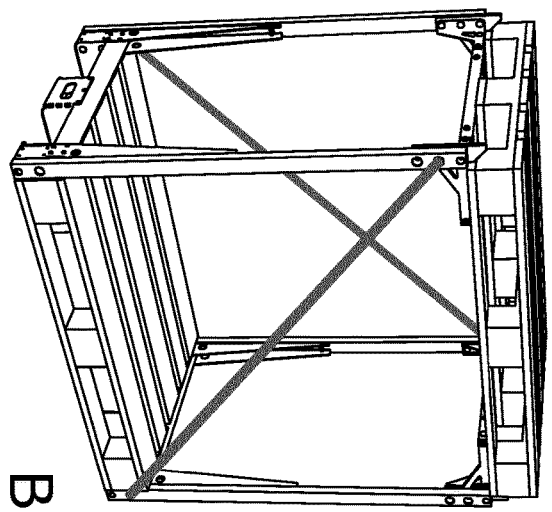

In a preferred embodiment of said support posts (42*a-b*) these are designed with one or more openings (44*a-f*), wherein one or more straps or lashings can be attached, if a carrier or an authority may wish or require that the pallet shelf system (4) after the invention, is further stabilized (c.f. e.g. FIG. 7B-D) or is lashed during transport (FIG. 7A).

It is an advantage of the present invention that the support frames (40) of the invention can easily be extended vertically to provide further decks of pallet shelves, wherein a first pallet shelf deck (911) can be defined by the lower pallet (10*a*) and lower pallet base unit (21), a second pallet shelf deck (912) by the upper pallet (10*b*) and the upper pallet base unit (41), and higher numbered pallet decks (91*x*) defined by further adding pallets base units space apart from the first two decks in an upwards direction.

Figure 9:
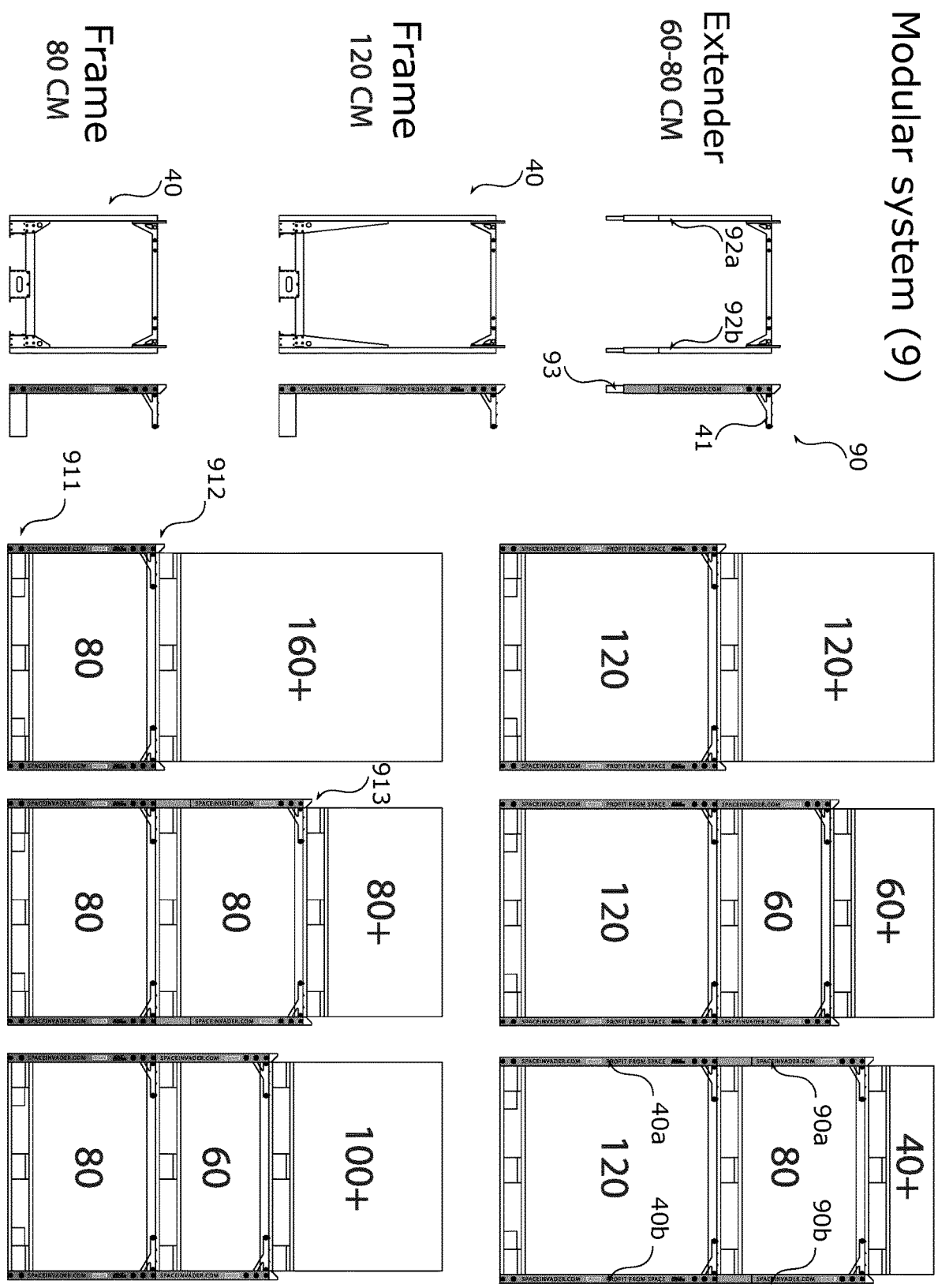
FIG. 9 shows a modular pallet shelf system according to the invention.

FIG. 9 shows an intended embodiment of a pallet shelf system (9) according to the invention comprising at least three pallet decks (911,912,913), which pallet shelf system is a modular system (9). The modular pallet shelf system (9) comprising at least three pallet decks (911,912,913), comprises a pallet shelf system (4) according to the embodiments described herein, the pallet shelf system (4) according to the embodiments described herein forming a first (911) and a second (912) pallet deck, the modular pallet shelf system (9) further comprising at least two extenders (90*a*, 90*b*) and at least a further pallet, wherein two extenders and a pallet forms a further pallet deck (913).

An extender (90) according to a preferred embodiment comprises at least two extender posts (92*a*,92*b*) and an upper pallet base unit (41) according to the embodiments of the present invention. The extender (90) is formed by connecting the at least two extender posts (92*a*,92*b*) at right angles to respective connecting sections (420*a*,420*b*) of the upper pallet base unit (41), thereby forming an H-shaped or a U-shaped extender (90). When a U-shaped extender is formed, it is generally intended that further pallet decks can be added to the modular pallet shelf system (9), whereas the H-shaped extenders provides additional support to the topmost pallet decks in the modular system against unwanted movement of the topmost pallet and/or goods stored thereupon.

To add an extender (90) to the pallet shelf system (4) of the invention, each extender post (92) is preferably fitted with a connector (93); which can connect to and firmly engage a receiver element on the underlying pallet deck. In FIG. 5B, the receiver element is formed by the interior (53) of the support post (42) which can receive the connector (93) in the form of a connector tongue inside the support post (42). If the connector (93) of the embodiment has at least one through-bore matching one of the openings (44*a-f*) on the support post (42), a locking pin or such like can be inserted to further lock the extender in position and secure the modular pallet shelf system (9) during transport.

In FIG. 9 some representative lengths ($h_1$) of the support frames (40) and the extenders (90). It is in general contemplated that the height ($h_1$) of the support frames (40) shall be between 80 cm to 160 cm, particularly 80 cm (red color frame in FIG. 9) and 120 cm (green color frame in FIG. 9), and that the height ($h_1$) of the extenders shall be between 60 cm to 80 cm (blue color frame in FIG. 9). Thereby is will normally always be possible to establish at least three pallet decks (911,912,913) inside the allocated standard heights of containers and semitrailers.

Across the figures, see FIGS. 3, 5 and 6, certain lengths, $z_1$, $z_2$, $z_3$ and $z_4$ have been indicated, which have not been described and explained so far but will be described below with reference to a method of stacking the support frames (40) for transport when these support frames are not forming part of a pallet shelf system (4) according to the invention. The inventors have recognized that this is a further advantage of the present invention, that if the lengths $z_1$, $z_2$, $z_3$ and $z_4$ are chosen correctly, then the support frames (40) according to the invention can be stacked efficiently and stably for transport without goods, as said upper pallet base unit's (41) protrusions (412a,412b) effectively can be used to establish a stable, stacked pallet (10) with support frames (40).

Figure 8:
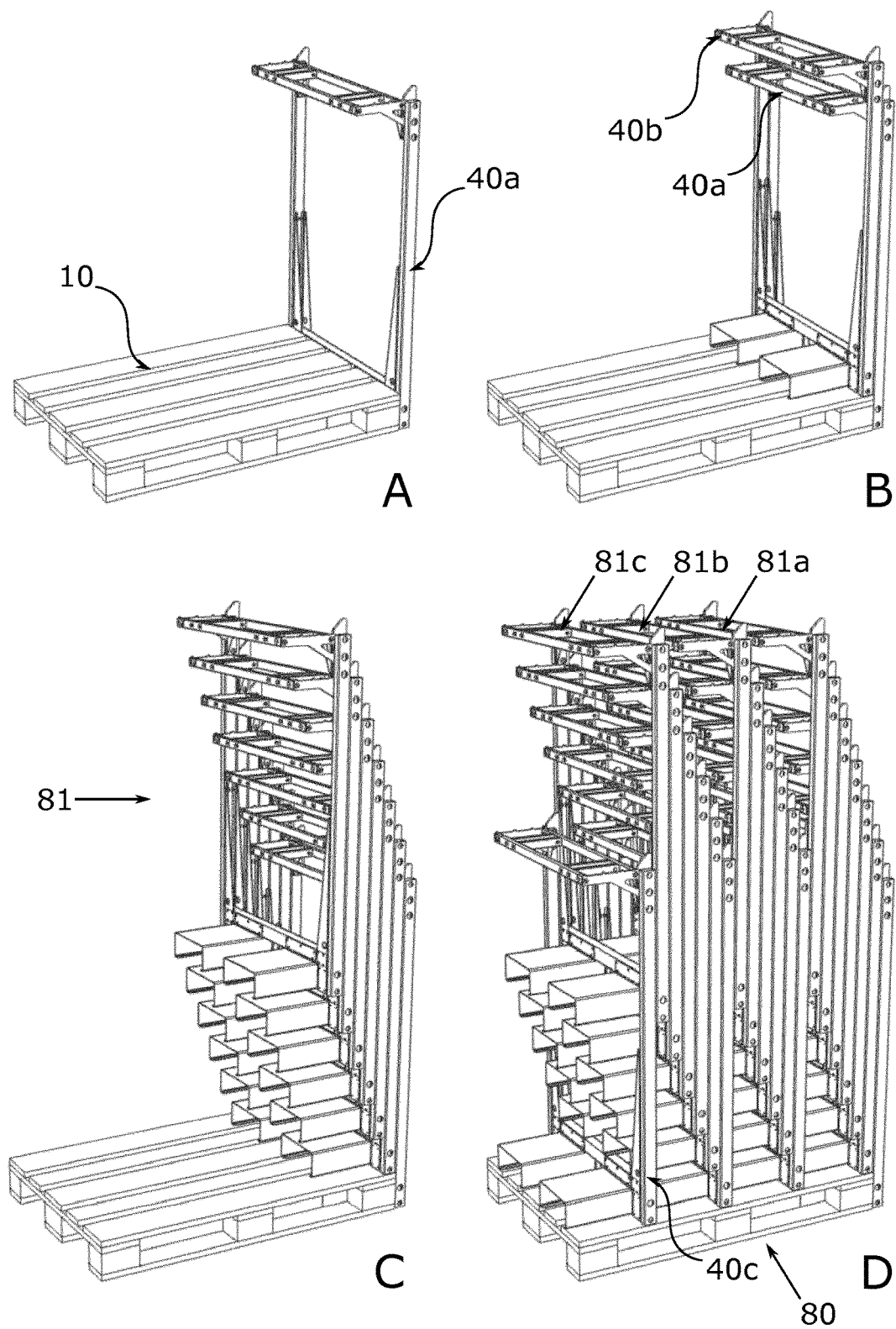
FIG. 8 shows how the support frames advantageously can be stacked on a single pallet in accordance with the present invention.

In FIG. 8, the method of forming a stack (80) of the present support frames (40) on a standard pallet (10) for transport is exemplary illustrated. In a first step (FIG. 8A) a first support frame (40a) is placed under a standard pallet (10) by inserting the protrusions (212a,212b) of the lower base unit (21) into the respective fork pockets of a pallet in the usual manner, as if one wanted to establish the pallet shelf system according to the invention. In a next and second step (FIG. 8B) a next support frame (40b) is placed in a such way with the lowest bottom surface (417) of said pallet base unit (41b) on top of said support frame's (40a)'s upper pallet base unit's (41a) pallet supporting surface (416) and on top of said standard pallet (10), that said next support frame's (40b) support posts (42) are closely positioned or touches the said first support frame's (40a) support posts (42) over a significant part of the lengths of the support posts (42). In a third step (FIG. 8C) said second step is repeated until a predetermined stack height is obtained and a first partial stack is established (81a) (consisting of 6 support frames (40) in the shown example), whereupon in a fourth step (FIG. 8D) said second and third step is repeated, thereby establishing at least one further partial stack (81a,81b,81c) until the stacking on said standard pallet (10) is terminated with a single support frame (40c).

By appropriate choosing the lengths, $z_1$, $z_2$, $z_3$ and $z_4$ the above stack (80) is self-locking and stable during transport, as will be described below.

The length $z_1$ represents the width of the respective connecting sections (420a,420b) of the upper pallet base unit (41) and will normally when the support posts (42) is designed, for example, in a square profile, be of the same width as the support posts (42). The length $z_2$ represents the distance from said connecting sections (420a,420b), measured from the pallet guide (414) to a respective first spike or barb (413a,413d) on said respective upper pallet base unit's (41) protrusions (412a,412b).

The length $z_3$ represents the length of said connecting sections (420a,420b) of the upper pallet base unit (41) measured from said pallet supporting surface (416) to the bottom point, line or surface of said connecting section (420), preferably to one of the connecting sections' (420a, 420b) lower defining surface having substantially the same width as the protrusions (412a,412b) of said upper pallet base unit (41). The length $z_4$ represents the distance from said lower pallet base unit's (21) protrusions' (212) lower contact surface towards the floor or pallet and to said lower pallet base unit's (21) rear piece (211) or lower rear piece (211), where said rear piece (211) is terminated by said upper surface (216).

The lengths ($z_1$,$z_2$) as well as ($z_3$,$z_4$) belong together in pairs and are adjusted in pairs so that the lengths $z_2$ and $z_3$ both are slightly larger, for example, less than 5 mm, preferably less than 3 mm, than their pairwise matching respective lengths $z_1$ and $z_4$. Thereby, the connecting sections (420a,420b) will fit between pallet guides (414a,414b) and a respective first spike or barb (413a,413d), and the stack will be lifted just sufficiently for a lower base unit (21) to engage and retain a lower base unit (21) arranged in a subsequent partial stack.

By choosing the lengths ($z_1$,$z_2$) and ($z_3$,$z_4$) in accordance with the above said guidelines, it will be obtained when the stack (80) is established that each partial stack (81a,81b,81c) will be locked and secured on the pallet (10). The lower pallet base units' (21) protrusions (212) on a first established part stack (81a) will then just reach over the lower pallet base unit's (21) rear piece's (211) upper surface (216) on a second established part stack (81b), whereby the weight of each behind-standing partial stack will be partly supported by a before-standing partial stack. Simultaneously, each partial stack (81a,81b,81c) will be locked at the top, as said connecting sections (420a,420b) of the upper pallet base unit (41) will be supported by an underlying pallet supporting surface (416) between the respective first spike or barb (413a,413d) and said pallet guides (414a,414b) established on said respective upper pallet base unit's (41) protrusions (412a,412b), whereby the movement of an upper positioned support frame (40b) in contact with said protrusion (412) of said projection's (412) longitudinal direction, will be limited to the space $z_2$ between said respective first spike or barb (413a,413b) and said respective pallet guides (414a,414b).

In the preferred embodiment of present invention, cf. FIG. 8, the stack (80) is constructed of 20 support frames (40) for which support frames the length $d_f$ is 40 cm, allowing a maximum number of stable, stacked support frames (40) on a euro pallet's 120 cm in the longitudinal direction. As according to European Union Council Directive 96/53/EC for articulated trucks and semitrailers, the floor space is approx. 40 pallets, after which the pallet shelving system (4) is established with two-layer pallets, a maximum of 10% of the floor space of the semitrailer will be occupied by a drive where the pallet shelving system (4) is not desired to be established or partially established, in connection with a given freight transport with a particular semitrailer.

As mentioned, it is a particular advantage of the pallet shelf system (4,9) according to the present invention that the pallet shelf systems can be established using both the longitudinal fork pockets (11a,11b) as well as the crosswise fork pockets (15a,15b) on the constituting pallets (10a,10b), while still permitting a forklift to move the resulting pallet shelf system from its place of assembly and e.g. into a semitrailer or a container.

FIG. 10 discloses modes of placing the pallet shelf systems of the invention inside a cargo hold of various semitrailers and containers for optimized use of floor space, wherein the pallet shelf systems can be oriented both longitudinally as well as crosswise in relation to the longest axis of the cargo hold, or a combination of both longitudinally and crosswise loading.

It is a general drawback of pallet shelf systems of the art that these increase the footprint of the individual pallet slightly (although this is more than compensated for by the at least one added pallet). However, the present pallet system allows for even further optimization of the floor use of the cargo hold due to the two disclosed configurations of the pallet shelf system of the invention.

Accordingly, there is furthermore herein described a truck or a lorry comprising a cargo hold, or a trailer or a container respectively comprising a cargo hold, wherein the cargo hold comprises a pallet shelf system (4,9) with at least two pallet shelves or decks (911,912,913), as in any of the above embodiments. Also described herein is, a standard size container comprising a pallet shelf system (4,9) with at least two pallet shelves or decks (911,912,913) as in any of the above embodiments.

FINAL COMMENTS

The term "comprise" as used in the claims does not exclude other elements or steps. The term "a" or "an" as used in the claims does not exclude a larger number. The reference descriptions used in the claims shall not be perceived as limiting for the use.

Although the present invention have been described in detail for purpose of illustration, it should be understood that such detail is solely for this purpose and that variations can be made hereof of those skilled in the art, without departing from the scope of the invention.

The invention claimed is:

1. A method of forming a stack of support frames on a standard pallet for transport comprising at least two longitudinal fork pockets, each support frame for use in a pallet shelf system having at least two pallet decks, and comprising at least two upright support posts, lower pallet base units comprising respective protrusions matching a respective fork pocket in size and shape, and an upper pallet base unit, wherein a standard pallet comprises at least two longitudinal fork pockets and two respective outer pallet legs, the support frame comprising a lower pallet base unit and an upper pallet base unit arranged in parallel, and at least two upright support posts arranged in parallel and connecting the lower and upper base units for forming the support frame; wherein:
   the lower pallet base unit comprises a lower rear piece and a plurality of respective first protrusions perpendicularly attached on one side of the first rear piece, the plurality of respective first protrusions matched in number and in size for fitting into a respective longitudinal openings of the at least two longitudinal fork pockets of an aforementioned standard pallet;
   the upper pallet base unit comprises an upper rear piece and a plurality of second protrusions perpendicularly attached on one side of the upper rear piece, the upper rear piece and the plurality of second protrusions thereby forming an upper pallet-supporting coplanar surface; and wherein at least two respective second protrusions of the plurality of second protrusions are positioned such that a respective second protrusion can support one of an aforementioned standard pallet's two respective outer pallet legs; and
   wherein the method comprises:
   in a first step, a first support frame is placed under the standard pallet by inserting the protrusions of the lower base unit into the respective longitudinal fork pockets of said pallet;
   in a next and second step, a next support frame is placed with a lowest bottom surface of said next support frame's upper pallet base unit on top of said first support frame's upper pallet base unit's pallet supporting coplanar surface and on top of the standard pallet, in such a way that said next support frame's support posts are closely positioned or touches said first support frame's support posts over a significant part of the lengths ($h_1$) of said support posts;
   in a third step, repeating said second step until a predetermined stack height is obtained and a first partial stack is established, whereupon in a fourth step said second and third steps are repeated, thereby establishing at least one further partial stack until the stacking on said standard pallet is terminated with a single support frame.

2. A method of forming a stack of support frames according to claim 1, wherein said respective partial stacks individually comprise up to six support frames in each respective partial stack.

3. A support frame for a standard pallet shelf system having at least two pallet decks, a standard pallet comprising at least two longitudinal fork pockets and two respective outer pallet legs; the support frame comprising a lower pallet base unit and an upper pallet base unit arranged in parallel, and at least two upright support posts arranged in parallel and connecting the lower and upper base units for forming the support frame; wherein:
   the lower pallet base unit comprises a lower rear piece and a plurality of respective first protrusions perpendicularly attached on one side of the first rear piece, the plurality of respective first protrusions matched in number and in size for fitting into a respective longitudinal openings of the at least two longitudinal fork pockets of an aforementioned standard pallet;
   the upper pallet base unit comprises an upper rear piece and a plurality of second protrusions perpendicularly attached on one side of the upper rear piece, the upper rear piece and the plurality of second protrusions thereby forming an upper pallet-supporting coplanar surface; and wherein at least two respective second protrusions of the plurality of second protrusions are positioned such that a respective second protrusion can support one of an aforementioned standard pallet's two respective outer pallet legs.

4. The support frame for a standard pallet shelf system having at least two pallet decks according to claim 3, wherein the upper rear piece and the at least two respective second protrusions of the plurality of second protrusions are combined with a front piece to form a rectangular frame.

5. The support frame for a standard pallet shelf system having at least two pallet decks according to claim 3, wherein the plurality of second protrusions comprises at least a further second protrusion for support for one or more middle pallet legs of an aforementioned standard pallet.

6. The support frame for a standard pallet shelf system having at least two pallet decks according to claim 3, wherein the upper pallet base unit further comprises further second protrusions located in parallel to and between the at least two respective second protrusions positioned for supporting an aforementioned standard pallet's two respective outer pallet legs.

7. The support frame for a standard pallet shelf system having at least two pallet decks according to claim 6, wherein a respective further second protrusion is located such a distance from a respective second protrusion positioned for supporting an aforementioned standard pallets respective two outer pallet legs that the respective further second protrusion is beneath a respective fork pocket of an aforementioned standard pallet when supported by the upper pallet base unit.

8. The support frame for a standard pallet shelf system having at least two pallet decks according to claim 3, wherein the upper pallet base unit further comprises stopping means for preventing movement of an aforementioned standard pallet when supported by the upper pallet base unit.

9. The support frame for a standard pallet shelf system having at least two pallet decks according to claim 8, wherein the stopping means comprises at least one spike or barb arranged on the upper pallet-supporting coplanar surface.

10. The support frame for a standard pallet shelf system having at least two pallet decks according to claim 3, wherein the upper pallet base unit further comprises one or more pallet guides comprising an inclined guiding surface.

11. The support frame for a standard pallet shelf system having at least two pallet decks according to claim 3, wherein the upper pallet base unit further comprises respective connecting sections for connecting the upper pallet base unit to a respective upright support post via a respective connecting section.

12. The support frame for a standard pallet shelf system having at least two pallet decks according to claim 11, wherein lengths $z_1$, $z_2$, $z_3$, and $z_4$ can be defined such that a stack formed of at least two support frames is self-locking and stable during transport, which lengths are adjusted in pairs $(z_1,z_2)$ and $(z_3,z_4)$ such that $z_2$ and $z_3$ are larger by less than 5 mm than their pairwise matching respective lengths $z_1$ or $z_4$, wherein z1 is the width of a respective connecting section of the upper pallet base unit, z2 is the distance from a respective connecting section of the upper pallet base unit to a respective first barb or spike on the upper pallet base unit, z3 is the length of a respective connecting section of the upper pallet base unit measured from the upper pallet-supporting coplanar surface to a lower defining surface having substantially the same width as a respective connecting section, and z4 is the distance a respective lower pallet base unit's protrusion's lower contact surface towards the floor or pallet to the lower rear piece's termination by an upper surface.

13. The support frame for a standard pallet shelf system having at least two pallet decks according to claim 3, wherein the upper pallet base unit further comprises slanting beams connecting the upper pallet base unit to the upright support posts by the connecting section.

14. The support frame for a standard pallet shelf system having at least two pallet decks according to claim 3, wherein the upper pallet base unit is cast as a single unit.

15. The support frame for a standard pallet shelf system having at least two pallet decks according to claim 3, wherein a respective first protrusion on the lower pallet base unit is constructed as a closed structure, a partially open structure, or a partially open structure comprising feet.

16. The support frame for a standard pallet shelf system having at least two pallet decks according to claim 3, wherein the lower rear piece comprises stabilizing beams for connecting the lower rear piece to the upright support posts.

17. The support frame for a standard pallet shelf system having at least two pallet decks according to claim 3, wherein the support frame is assembled from not more than six individually manufactured basic construction parts, comprising two support posts, upper pallet base unit, lower rear piece, and two respective first protrusions.

18. The support frame for a standard pallet shelf system having at least two pallet decks according to claim 3, wherein the support frame further comprises an extender for supporting a third pallet deck, the extender comprising an upper pallet base unit and at least two extender posts, each extender post comprising a connector for engaging a respective receiver element on an underlying pallet deck.

19. A pallet shelf system having at least two pallet decks, said system comprising at least two standard pallets, each standard pallet comprising at least two fork pockets for receiving the forks of a forklift; and at least two support frames according to claim 3; wherein said pallet shelf system is formed by inserting respective protrusions of said lower base units of said two support frames into matching respective fork pockets on a lower pallet thereby forming a first pallet deck; and subsequently forming said pallet shelf system comprising at least two pallet decks by placing an upper pallet on top of said upper pallet base units, such that said upper pallet base units support said upper pallet's outer pallet legs, thereby forming a second pallet deck.

\* \* \* \* \*